(12) United States Patent
Fyffe et al.

(10) Patent No.: US 11,061,157 B2
(45) Date of Patent: Jul. 13, 2021

(54) SYSTEMS AND METHODS TO LOCATE SEISMIC DATA ACQUISITION UNITS

(71) Applicant: Magseis FF LLC, Houston, TX (US)

(72) Inventors: Roger L. Fyffe, Sugar Land, TX (US); Etienne Marc, Houston, TX (US)

(73) Assignee: Magseis FF LLC, Houston, TX (US)

( * ) Notice: Subject to any disclaimer, the term of this patent is extended or adjusted under 35 U.S.C. 154(b) by 343 days.

(21) Appl. No.: 16/373,196

(22) Filed: Apr. 2, 2019

(65) Prior Publication Data

US 2019/0302301 A1 Oct. 3, 2019

Related U.S. Application Data

(60) Provisional application No. 62/651,603, filed on Apr. 2, 2018.

(51) Int. Cl.
*G01V 1/38* (2006.01)
*G01V 1/18* (2006.01)
*G01V 1/24* (2006.01)

(52) U.S. Cl.
CPC ............... *G01V 1/3852* (2013.01); *G01V 1/18* (2013.01); *G01V 1/247* (2013.01); *G01V 1/3817* (2013.01); *G01V 1/3835* (2013.01); *G01V 2210/1427* (2013.01)

(58) Field of Classification Search
CPC ........ G01V 1/3852; G01V 1/247; G01V 1/18; G01V 1/3835; G01V 2210/1427
See application file for complete search history.

(56) References Cited

U.S. PATENT DOCUMENTS

| 2006/0201243 | A1 | 9/2006 | Auffret et al. | |
| 2008/0080318 | A1 | 4/2008 | Maxwell et al. | |
| 2014/0254315 | A1* | 9/2014 | Rigsby | G01V 1/3852 367/15 |
| 2016/0041280 | A1* | 2/2016 | Naes | G01V 1/3852 367/149 |
| 2016/0056645 | A1* | 2/2016 | Henman | H02J 7/0045 320/112 |
| 2016/0349386 | A1* | 12/2016 | Naes | G01V 1/166 |

OTHER PUBLICATIONS

Mattaboni et al, "A Seismometer system for Ocean-Bottom Earthquake studies" Marine Geophysical Research 3, pp. 87-102 (Year: 1977).*

(Continued)

*Primary Examiner* — Ian J Lobo
(74) *Attorney, Agent, or Firm* — Foley & Lardner LLP; James De Vellis

(57) ABSTRACT

The present disclosure is directed to systems and methods of facilitating a seismic survey and locating seismic data acquisition units in a marine environment. The system can include a first seismic data acquisition unit. The first seismic data can include a cleat ring to couple the first seismic data acquisition with a second seismic data acquisition unit. The system can include a rope having a first end coupled to a first portion of the first seismic data acquisition unit and a second end coupled to a second portion of the first seismic data acquisition unit. The system can include a cavity formed by the cleat ring. The system can include a telltale component coupled to a portion of the rope. The rope and the telltale component can be stored in the cavity of the first seismic data acquisition unit.

20 Claims, 12 Drawing Sheets

(56) References Cited

OTHER PUBLICATIONS

Sutton et al, "Optimum Design of Ocean Bottom Seismometers", Marine Geophysical Researches 9, pp. 47-65 (Year: 1987).*
International Preliminary Report on Patentability, Ch. I, for PCT/US2019/025382 dated Oct. 15, 2020 (11 pages).
Hays, "Semipermanent Reservoir Monitoring with Ocean Bottom Nodes," Apr. 1, 2017.
International Search Report and Written Opinion for PCT/US2019/025382 dated Jun. 28, 2019.
Walker et al., "Autonomous Nodes—the Future of Marine Seismic Data Acquisition?," 12th International Congress of the Brazilian Geophysical Society & Expogef, Rio de Janeiro, Brazil, Aug. 15-18, 2011.

\* cited by examiner

SYSTEMS AND METHODS TO LOCATE SEISMIC DATA ACQUISITION UNITS

CROSS-REFERENCES TO RELATED APPLICATIONS

This application claims the benefit of priority under 35 U.S.C. § 119 to U.S. Provisional Patent Application No. 62/651,603, filed Apr. 2, 2018, which is hereby incorporated by reference herein in its entirety.

BACKGROUND

A seismic data acquisition system can acquire seismic data relating to subsurface features, such as lithological formations or fluid layers that may indicate the presence of hydrocarbons, minerals or other elements. An acoustic signal can penetrate the surface of the earth. The acoustic signal can reflect or refract off of subsurface lithological formations. The reflected or refracted acoustic signals can be acquired, analyzed, and interpreted to indicate physical characteristics of, for example, the lithological formations such as the presence of hydrocarbons.

SUMMARY

The present disclosure is directed to systems and methods for performing a seismic survey, or systems and methods of deploying or retrieving seismic data acquisition units to facilitate the performance of a seismic survey. Due to the large number of seismic data acquisition units (or receivers) that are used to collect seismic data, and the positioning of the seismic data acquisition units in subsea environments or densely stacked storage containers on a vessel, it may be challenging to determine the position or functional status of the seismic data acquisition unit. Further, there may be limited available space to add electronic components or transmitters to the seismic data acquisition unit, or it may not be possible to add electronic components to a seismic data acquisition unit that is in a sealed housing or case. Further, the inability to locate a seismic data acquisition unit or determine the status of the unit or component within the unit can result in inefficiencies related to deploying or retrieving the unit, accurately or reliably acquiring seismic data, or maintaining the seismic data acquisition unit.

Systems and methods of the present disclosure solve these and other problems associated with performing a seismic survey and locating seismic data acquisition units in a marine environment. For example, a system can include a seismic data acquisition unit with a telltale component attached in a tail or hoop configuration to a seismic data acquisition unit. In a hoop configuration, the telltale can be attached to a portion of the rope, and the two ends of the rope can be attached to the seismic data acquisition unit. In a tail configuration, the telltale can be attached to a portion of the rope, and one end of the rope can be attached to the seismic data acquisition unit.

At least one aspect is directed to a system. The system can include a first seismic data acquisition unit. The first seismic data can include a case having a wall defining an internal compartment. The first seismic data can include a power source, a clock, a seismic data recorder, and at least one geophone disposed within the case. The first seismic data can include a cleat ring positioned on a perimeter of a first side of the seismic data acquisition unit to couple, in a stack, the first seismic data acquisition with a second seismic data acquisition unit. The system can include a rope having a first end coupled to a first portion of the first seismic data acquisition unit and a second end coupled to a second portion of the first seismic data acquisition unit. The system can include a cavity formed by the cleat ring on the first side of the first seismic data acquisition unit. The system can include a telltale component coupled to a portion of the rope. The rope and the telltale component can be stored in the cavity of the first seismic data acquisition unit. The second seismic data acquisition unit can be coupled with the first seismic data acquisition unit via the cleat ring on the perimeter of the first side to form the stack.

At least one aspect is directed to a method. The method can include providing a first seismic data acquisition unit. The first seismic data acquisition unit can include a case having a wall defining an internal compartment. The first seismic data acquisition unit can include a power source, a clock, a seismic data recorder, and at least one geophone disposed within the case. The first seismic data acquisition unit can include a cleat ring positioned on a perimeter of a first side of the seismic data acquisition unit to couple, in a stack, the first seismic data acquisition with a second seismic data acquisition unit. The first seismic data acquisition unit can include a cavity formed by the cleat ring on the first side of the first seismic data acquisition unit. The method can include providing a rope having a first end coupled to a first portion of the first seismic data acquisition unit and a second end coupled to a second portion of the first seismic data acquisition unit. The method can include providing a telltale component coupled to a portion of the rope. The rope and the telltale component can be stored in the cavity of the first seismic data acquisition unit. The second seismic data acquisition unit can be coupled with the first seismic data acquisition unit via the cleat ring on the perimeter of the first side to form the stack.

At least one aspect is directed to a system. The system can include a first seismic data acquisition unit. The first seismic data acquisition unit can include a case having a wall defining an internal compartment. The first seismic data acquisition unit can include a power source, a clock, a seismic data recorder, and at least one geophone disposed within the case. The first seismic data acquisition unit can include a cleat ring positioned on a perimeter of a first side of the seismic data acquisition unit to couple, in a stack, the first seismic data acquisition with a second seismic data acquisition unit. The system can include a rope having a first end coupled to a first portion of the first seismic data acquisition unit. The system can include a cavity formed by the cleat ring on the first side of the first seismic data acquisition unit. The system can include a telltale component coupled to a portion of the rope. The rope and the telltale component can be stored in the cavity of the first seismic data acquisition unit. The second seismic data acquisition unit can be coupled with the first seismic data acquisition unit via the cleat ring on the perimeter of the first side to form the stack.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
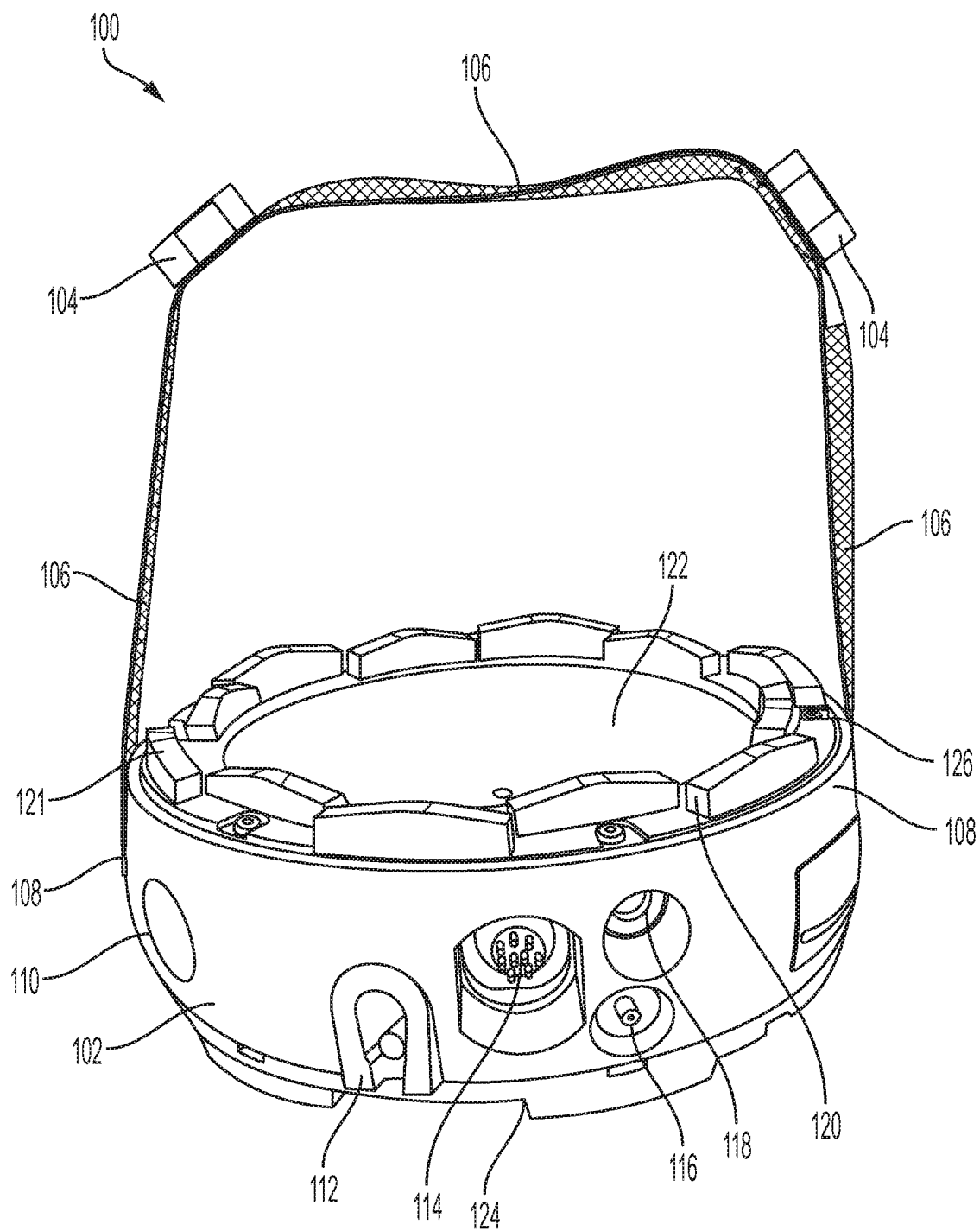
FIG. 1 depicts an illustration of a telltale attached to a seismic data acquisition unit with a rope in a hoop configuration, in accordance with an implementation.

The present disclosure is directed to systems and methods that improve operations related to performing a seismic survey. For example, systems and methods of the present disclosure can allow for efficient storage and maintenance of seismic data acquisition units, thereby reducing damage to the seismic data acquisition units and reducing resource consumption. The systems and methods of the present disclosure can allow for locating seismic data acquisition units in a marine environment.

The present disclosure is directed to systems and methods for performing a seismic survey, or systems and methods of deploying or retrieving seismic data acquisition units to facilitate the performance of a seismic survey. Due to the large number of seismic data acquisition units (or receivers) that are used to collect seismic data, and the positioning of the seismic data acquisition units in subsea environments or densely stacked storage containers on a vessel, it may be challenging to determine the position or functional status of the seismic data acquisition unit. Further, there may be limited available space to add electronic components or transmitters to the seismic data acquisition unit, or it may not be possible to add electronic components to a seismic data acquisition unit that is in a sealed housing or case. Further, the inability to locate a seismic data acquisition unit or determine the status of the unit or component within the unit can result in inefficiencies related to deploying or retrieving the unit, accurately or reliably acquiring seismic data, or maintaining the seismic data acquisition unit.

Systems and methods of the present disclosure solve these and other problems associated with performing a seismic survey. For example, a system can include a seismic data acquisition unit with a telltale component attached in a tail or hoop configuration to a seismic data acquisition unit. In a hoop configuration, the telltale can be attached to a portion of the rope, and the two ends of the rope can be attached to the seismic data acquisition unit. In a tail configuration, the telltale can be attached to a portion of the rope, and one end of the rope can be attached to the seismic data acquisition unit.

The rope can be a flat rope, such as a rope of metal or fiber having a flat cross section. The flat rope can be formed by braiding or sewing. The flat rope can be formed of a webbing. The flat rope and telltale can be stowed, stored, inserted, placed on, or positioned on a side of the seismic data acquisition unit. For example, a first side of the seismic data acquisition unit can include a surface and raised perimeter wall. The raised perimeter wall can include a cleat ring. For example, the seismic data acquisition unit can include cleat rings. The cleat rings can be formed of two rings of inner and outer cleats, where the cleats are staggered by a predetermined degree. The cleat rings can facilitate orienting the seismic data acquisition unit as they are stacked, and also interlocking the seismic data acquisition unit to one another to keep rotation of the units relative to one another below a threshold. The surface and cleat ring can form an indent or cavity on the seismic data acquisition unit. The rope and telltale can be placed in the cavity such that when a second seismic data acquisition unit is stacked on top of the seismic data acquisition unit, the rope and telltale are not damaged and the stacked units are stable.

FIG. 1 depicts an illustration of a telltale attached to a seismic data acquisition unit with a rope in a hoop configuration, in accordance with an implementation. The system 100 can include the seismic data acquisition unit 102. A rope 106 can be attached to the seismic data acquisition unit 102. A telltale 104 can be attached to the rope 106, which is in-turn attached to the seismic data acquisition unit 102. The seismic data acquisition unit 102 can include or be referred to as a unit, node, ocean bottom seismometer, self-contained ocean bottom seismometer, geophone, or hydrophone. The seismic data acquisition unit 102 can include one or more components, such as a geophone, hydrophone, clock, power source, memory, high speed recorder, seismic recorder, accelerometer, transducer, transmitter, or wireless transmitter. The seismic data acquisition unit 102 can include a case having a wall defining an internal compartment. The power source, clock, seismic data recorder, and at least one geophone can be disposed within the case. The seismic data acquisition unit 102 can include a cleat ring 121 positioned on a perimeter of a first side 122 of the seismic data acquisition unit 102. The cleat ring 121 can couple, in a stack, the first seismic data acquisition 102 with a second seismic data acquisition unit 102. The seismic data acquisition unit 102 can include a wireless module that transmits status information for the seismic data acquisition unit 102. The wireless module can transmit information about a powered state of the seismic data acquisition unit 102. The wireless module can transmit information about the battery level of the seismic data acquisition unit 102. The wireless module can transmit information about seismic data acquisition units 102 that are within a predetermined range of the seismic data acquisition unit 102.

The rope 106 can be attached to the seismic data acquisition unit 102 at fastener 108. The rope 106 depicted in FIG. 1 is in a hoop configuration. The hoop configuration includes a rope 106 that is attached at a first end 108 and a second end 108. The first end 108 and the second end 108 can be located at different points on the seismic data acquisition unit 102. The first end 108 and the second end 108 can include or be referred to as an attachment point, attachment mechanism, fastening point, fastener, coupling point, or coupling mechanism. The attachment points can include anchors, screws, nuts, bolts, pins, latches, adhesives, magnets or other coupling mechanism. The rope can have a first end coupled to a first portion of the first seismic data acquisition unit 102 and a second end 108 coupled to a second portion of the first seismic data acquisition unit 102. The first end 108 can be coupled to the wall of the first seismic data acquisition unit 102 outside the perimeter formed by the cleat ring 121. The second end 108 can be coupled to the wall of the first seismic data acquisition unit 102 outside the perimeter formed by the cleat ring 121. The first end 108 coupled to the first portion of the first seismic data acquisition unit 102 within the perimeter formed by the cleat ring, and the second end 108 coupled to the second portion of the first seismic data acquisition unit 102 within the perimeter formed by the cleat ring can form a hoop.

The rope 106 can be a flat rope, such as a rope of metal or fiber having a flat cross section. The rope 106 can be formed by braiding or sewing. The rope 106 can be formed of a webbing. The rope 106 can have a predetermined length. The length of the rope 106 can be based on the number of telltales 104 attached to the rope 106. The length of the rope can be based on the attachment configuration, such as a hoop configuration where both ends of the rope 106 are attached to the seismic data acquisition unit 102, or a tail configuration where only one end of the rope 106 is attached to the seismic data acquisition unit 102. The rope 106 can be formed of a polypropylene webbing. The rope 106 can be formed of a heavy-duty polypropylene webbing, such as 4000# tensile strength. The rope 106 can have a width, such as 0.5 inches, 1 inch, 1.5 inches, or 2 inches. The length of the rope 106 can be such that the rope 106 can from a first portion 108 of the seismic data acquisition unit 102 to a second portion 108 of the seismic data acquisition 102 in a hoop configuration, while providing a sufficient opening formed by the hoop to allow an underwater vehicle with an arm to pick up the seismic data acquisition unit via the hoop. For example, the length of the rope 106 can be 1 foot, 1.5 feet, 2 feet or some other length that facilitates performing a seismic survey.

The attachment configuration of the rope 106 can be a hoop configuration in which both ends of the rope are attached to the seismic data acquisition unit 102. The hoop configuration can facilitate recovery of the seismic data acquisition unit 102. For example, a remotely operated vehicle 35A can use arm 60 to grab the hoop formed by the rope 106. The hoop attachment configuration can also facilitate recovery in motion, such as while the ROV 35A, vessel 5, or seismic data acquisition unit 102 is in motion.

The system 100 can include one or more telltales 104 attached to the rope 106. The telltales 104 can be attached to the rope 106 at predetermined locations. The number of telltales 104 or the location at which the telltales 104 are attached can be based on the attachment configuration (e.g., hoop or tail). The system 100 can include, for example, one, two, three, four, five or more telltales attached to the rope 106. The system 100 can include two telltales 104 attached to the rope 106 in a hoop configuration. The system 100 can include one telltale 104 attached to the rope 106 in the hoop configuration. The system 100 can include two telltales 104 attached to the rope 106 in a tail configuration. The system 100 can include one telltale 104 attached to the rope 106 in the tail configuration.

A telltale 104 can be a device used to indicate a position or function of the seismic data acquisition unit 102, or one or more components of the seismic data acquisition unit 102. The telltale 104 can include a housing. The housing can be made of metal, plastic, rubber, an alloy, or some other material. The housing of the telltale 104 can have negative buoyancy or can have positive buoyancy, or neutral buoyancy. The housing of the telltale 104 can be water resistant or waterproof. The housing of the telltale 104 can be formed of one or more portions. The telltale 104 can include an internal compartment that includes one or more components. The telltale 104 can include a transmitter, beacon, radio frequency identifier, acoustic transmitter, near field communications, light or other indicator. In some cases, the telltale 104 can provide status information for the seismic data acquisition unit 102. Status information can include or indicate whether the seismic data acquisition unit 102 is operational, turned on, recording, battery power, disabled, fault, or location.

The seismic data acquisition unit 102 can include connection ends 108. For example, the seismic data acquisition unit 102 can include a first connection end 108 and second connection end 108. The connection ends 108 can include any type of connector, such as anchor points molded into the bumper of the seismic data acquisition unit 102.

The seismic data acquisition unit 102 can include a first opening or port 110. The port 110 can provide for a connection or interface. The opening or port 110 can include a connector. The opening or port can provide an indication, such as a light indication. The seismic data acquisition unit 102 can include a second connection, opening or port 112. The second connection, opening or port can include a connector. The opening or port can include a cap or seal.

The seismic data acquisition unit 102 can include a third connector 114 on the seismic data acquisition unit 102 that provides both maintenance and time efficiencies to operations related to performing a seismic survey. The third connector 114 can be positioned on a portion of the seismic data acquisition unit 102. The third connector 114 can be placed on side of the seismic data acquisition unit 102.

The seismic data acquisition unit 102 can include a fourth connection, opening or port 116. The fourth connection, opening or port can include a connector. The fourth opening or port can include a cap or seal. The seismic data acquisition unit 102 can include a fifth connection, opening or port 118. The fifth connection, opening or port 118 can include a connector. The fourth opening or port can include a cap or seal.

The seismic data acquisition unit 102 can have a first side 122. The first side 122 can be referred to as a top side. The seismic data acquisition unit can have a second side 124, which can be referred to as a bottom side. The seismic data acquisition unit 102 can be disk shaped. For example, the seismic data acquisition unit 102 can have a width or diameter that is greater than a height. The height can be the distance between the top side 124 and the bottom side 124. The width can be the diameter of the top side 122. For example, the diameter (or width) can range from 10 inches to 30 inches. The height can range from 5 inches to 20 inches. In some cases, the diameter can be less than or equal to 20 inches, and the height can be less than or equal to 10 inches. For example, a configuration of the seismic data acquisition unit 102 can include a diameter of 19.9 inches and a height of 10 inches; a diameter of 21 inches and a height of 10.5 inches; a diameter of 12 inches and a height of 4 inches; or a diameter of 17 inches and a height of 6 inches, for example. The seismic data acquisition unit 102 can be circular, rectangular, oval, octagonal, pentagonal, polygonal, or have another shape that facilitates seismic data acquisition.

The seismic data acquisition unit 102 can include first cleats 120 and second cleats 126. The first cleats 120 can form a first cleat ring, and the second cleats 126 can form a second cleat ring. The first cleat ring and the second cleat ring can be referred to as cleat rings 121. First cleats 120 can be referred to as outer cleats, and second cleats 126 can be referred to as inner cleats. The outer cleats can be positioned on a perimeter of the seismic data acquisition unit 102, while the inner cleats can be form an inner cleat ring adjacent or proximate to the outer cleats. The first and second cleat rings can be coupled to the first side 122 of the seismic data acquisition unit 102. The first and second cleat rings can be coupled to the second side 124 of the seismic data acquisition unit 102. The cleats 120 and 126 can be positioned such that they do not overlap.

The seismic data acquisition unit 102 can include a coupling mechanism (e.g., via first connector 110, second connector 112, fourth connector 116 or fifth connector 118). The coupling mechanism can include a component configured to facilitate coupling the seismic data acquisition unit 102 or facilitate deployment or storage of the seismic data acquisition unit 102. For example, the coupling mechanism can include a ring through which a cable (e.g., cable 44A or cable 70 depicted in FIG. 9) can be inserted in order to facilitate deploying the seismic data acquisition unit 102.

With the hoop configuration illustrated in FIG. 1, an underwater vehicle such as an ROV having an arm (e.g., fixed arm or robotic arm) can move towards the hoop formed by the rope 106. The arm can move within the perimeter of the hoop. The underwater vehicle can move the first seismic data acquisition via the hoop. For example, the underwater vehicle can use the arm to lift rope up via the hoop, which can lift up the seismic data acquisition unit 102. The underwater vehicle can detect the first seismic data acquisition unit 102 via an acoustic beacon from the telltale 104. The underwater vehicle, using the hoop to pick up the seismic data acquisition unit 102, can more efficiently retrieve or deploy the seismic data acquisition units 102 to more efficiently perform the seismic survey. For example, using the hoop configuration can save up to 30 seconds, 1 minute, 2 minutes or more per unit 102 for deploying or retrieval, which can reduce the overall resource consumption of the underwater vehicle or ROV, battery usage, power usage, or number of units 102 used. The underwater vehicle can perform a fly-by deployment. A fly-by deployment can include launching seismic data acquisition units 102 while the underwater vehicle is in motion. The fly-by deployment can save time over the underwater vehicle having to stop to deploy nodes. The underwater vehicle can perform a fly-by retrieval. A fly-by retrieval can include retrieving seismic data acquisition units 102 while the underwater vehicle is in motion. The fly-by retrieval can save time over the underwater vehicle having to stop to deploy nodes. The underwater vehicle can transmit status information for the seismic data acquisition unit 102. The underwater vehicle can detect the seismic data acquisition unit 102 via an acoustic beacon from the telltale. The underwater vehicle can detect the seismic data acquisition unit 102 via an optical beacon from the telltale.

The telltale 104 can include an acoustic beacon. The acoustic beacon can initiate optical transmission. Responsive to the telltale 104 being removed from the cavity formed by the cleat ring 121 on the first side 122, the acoustic beacon can initiate acoustic transmission. Responsive to removal of the second seismic data acquisition unit 102 from the stack, the acoustic beacon can initiate acoustic transmission. The acoustic beacon can disable acoustic transmission when the telltale 104 is stored in the cavity formed by the cleat ring 121 on the first side 122. The seismic data acquisition unit 102 can automatically determine that the telltale 104 is stored in the cavity. Responsive to the determination that the acoustic beacon is stored in the cavity, the seismic data acquisition unit 102 can stop acoustic transmission to conserve battery power.

The telltale 104 can include an optical beacon. The optical beacon can initiate optical transmission. Responsive to the telltale 104 being removed from the cavity formed by the cleat ring 121 on the first side 122, the optical beacon can initiate optical transmission. Responsive to removal of the second seismic data acquisition unit 102 from the stack, the optical beacon can initiate optical transmission. The optical beacon can disable optical transmission when the telltale 104 is stored in the cavity formed by the cleat ring 121 on the first side 122. The seismic data acquisition unit 102 can automatically determine that the telltale 104 is stored in the cavity. Responsive to the determination that the optical beacon is stored in the cavity, the seismic data acquisition unit 102 can stop optical transmission to conserve battery power.

The telltale 104 can include a sensor to determine whether the telltale 104 has negative buoyancy, positive buoyancy, or neutral buoyancy. The telltale 104 can include a level sensor (e.g., a float switch). The telltale 104 can use level sensor as an indicator to control the buoyancy of the telltale 104. The telltale 104 can include a sensor to determine the proximity of the telltale 104 to the seismic data acquisition unit 102. The telltale 104 can include a sensor to determine the proximity of the telltale 104 to the cavity of the seismic data acquisition unit 102. The telltale 104 can include a sensor to determine the proximity of the telltale 104 to the cavity formed by the cleat ring 121 of the seismic data acquisition unit 102.

Figure 2:
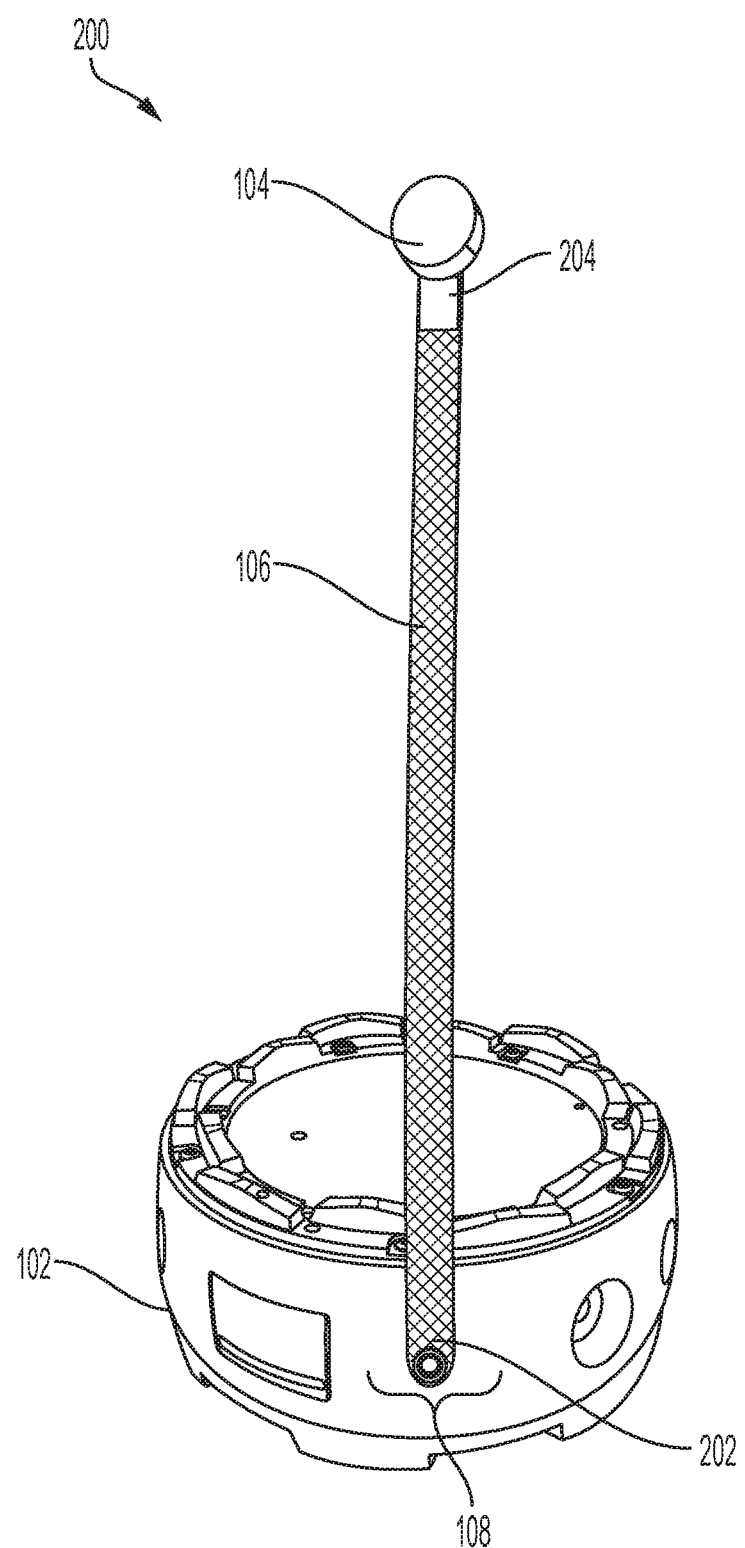
FIG. 2 depicts an illustration of a telltale attached to a seismic data acquisition unit with a rope in a tail configuration, in accordance with an implementation.

FIG. 2 depicts an illustration of a telltale attached to a seismic data acquisition unit with a rope in a tail configuration, in accordance with an implementation. The system 200 can include one or more system or component of system 100 depicted in FIG. 1. The system 200 includes the end 108. The rope 106 can be coupled to the seismic data acquisition unit 102 via the end 108. The rope 106 can have only one portion. The rope 106 can have a telltale 104 attached to a second end 204 of the rope that is opposite the first end 202 of the rope. The configuration of system 200 can be referred to as a tail configuration in which the first end 202 of the rope is coupled to the seismic data acquisition unit, and the second end 204 is not coupled to the seismic data acquisition unit 102, and the second end 202 is coupled to the telltale 104.

Figure 3:
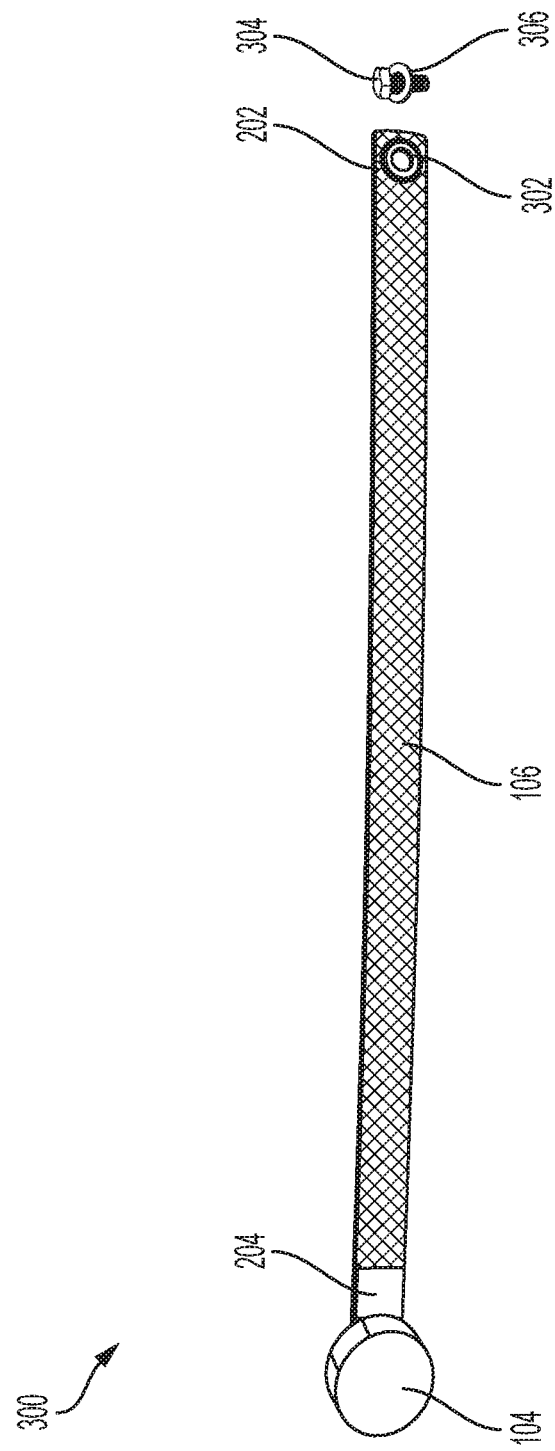
FIG. 3 depicts an illustration of a telltale and rope configured to be attached to a seismic data acquisition unit in a tail configuration, in accordance with an implementation.

FIG. 3 depicts an illustration of a telltale and rope configured to be attached to a seismic data acquisition unit in a tail configuration, in accordance with an implementation. The system 300 can include one or more system or component of system 100 depicted in FIG. 1 or system 200 depicted in FIG. 2. System 300 can include the rope 106 and telltale 104 that are coupled to the seismic data acquisition unit 102 depicted in FIGS. 1 and 2. The rope 106 can include, at the first end 202, an opening 302. The opening 302 can include a grommet. The grommet can be a brass grommet. The grommet can be a #2 brass grommet. The rope 106 can be connected to the seismic data acquisition unit 102 using a bolt 304 or screw with a disc 306. The bolt 304 can be inserted into the grommet 302, which can be inserted into the end 108 of the seismic data acquisition unit. For example, the end 108 of the seismic data acquisition unit 102 can include brass anchor points molded into the bumper. The bolt 304 can include a hex head machine bolt, for example. The bolt 304 can include a 5/16 inch diameter 316I SS hex head machine bolt, for example. The disc 306 can include a foam disc. The disc 306 can include a syntactic foam disc. The disc 306 can include a 2 inch diameter by 3/4 inch thick 300 m rated syntactic foam disc that has a 42# confor foam ("cf") density, for example. Confor form can refer to a conforming foam cushion that has the capability of absorbing impact shock. The syntactic foam can withstand pressures at which the seismic data acquisition unit 102 is deployed. The syntactic foam can have neutral or negative buoyancy at depths at which the seismic data acquisition unit 102 is deployed. The second end 204 can include a marine grade reflective tape that is coupled to the rope 106 via a marine grade epoxy resin.

Figure 4:
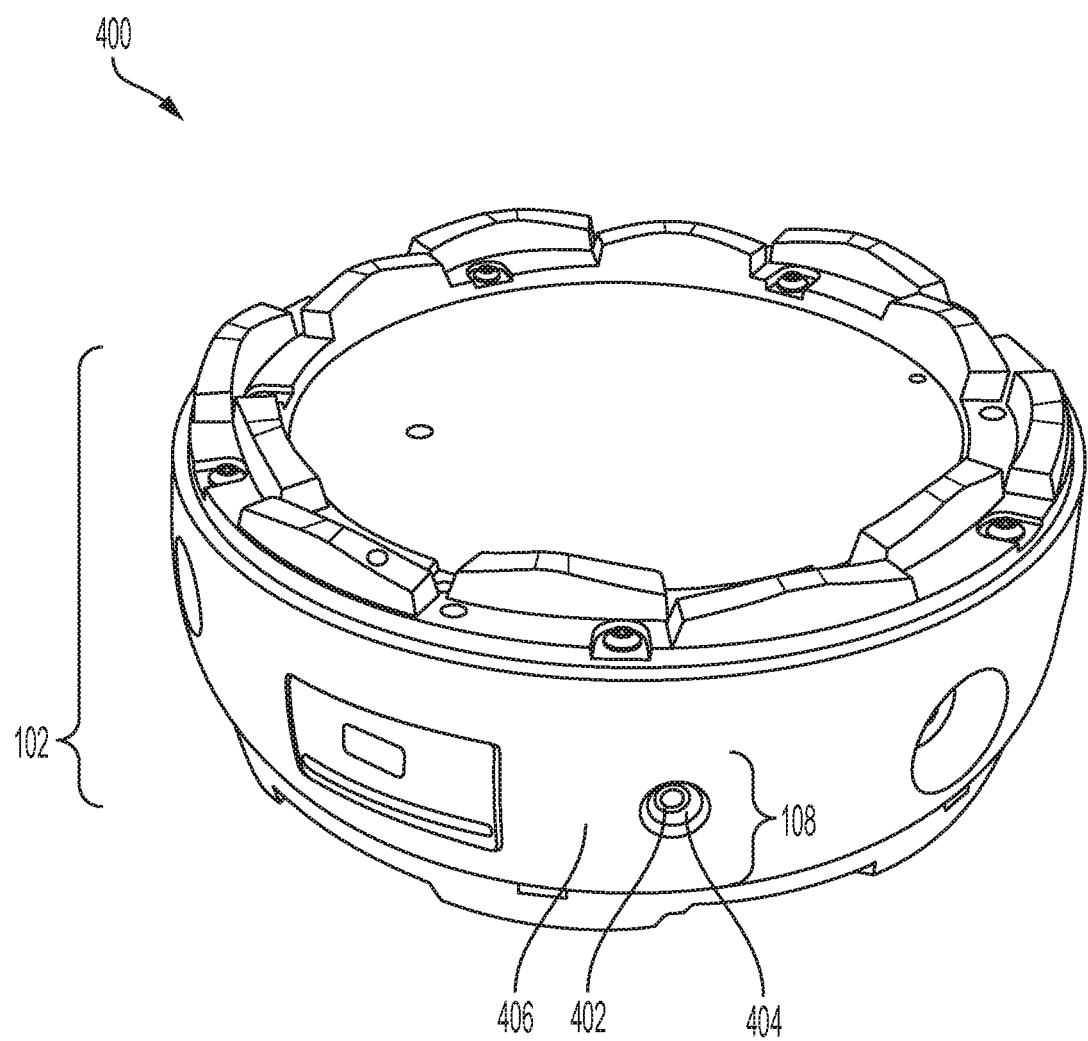
FIG. 4 depicts an illustration of a seismic data acquisition unit configured to receive a telltale and rope, in accordance with an implementation.

FIG. 4 depicts an illustration of a seismic data acquisition unit configured to receive a telltale and rope, in accordance with an implementation. The system 400 can include one or more system or component of system 100, 200 or 300 depicted in FIG. 1, 2 or 3. The system 400 illustrates the end 108 of the seismic data acquisition unit 102 at which the rope 106 is connected to the seismic data acquisition unit 102. The end 108 can include brass anchor points 402. The end 108 can include a surface 404 outside the brass anchor point 402. The surface 404 can form a cavity in the bumper 406 of the seismic data acquisition unit 102. The bumper 406 can refer to an outside portion that goes around some or all of the perimeter of the seismic data acquisition unit 102.

Figure 5:
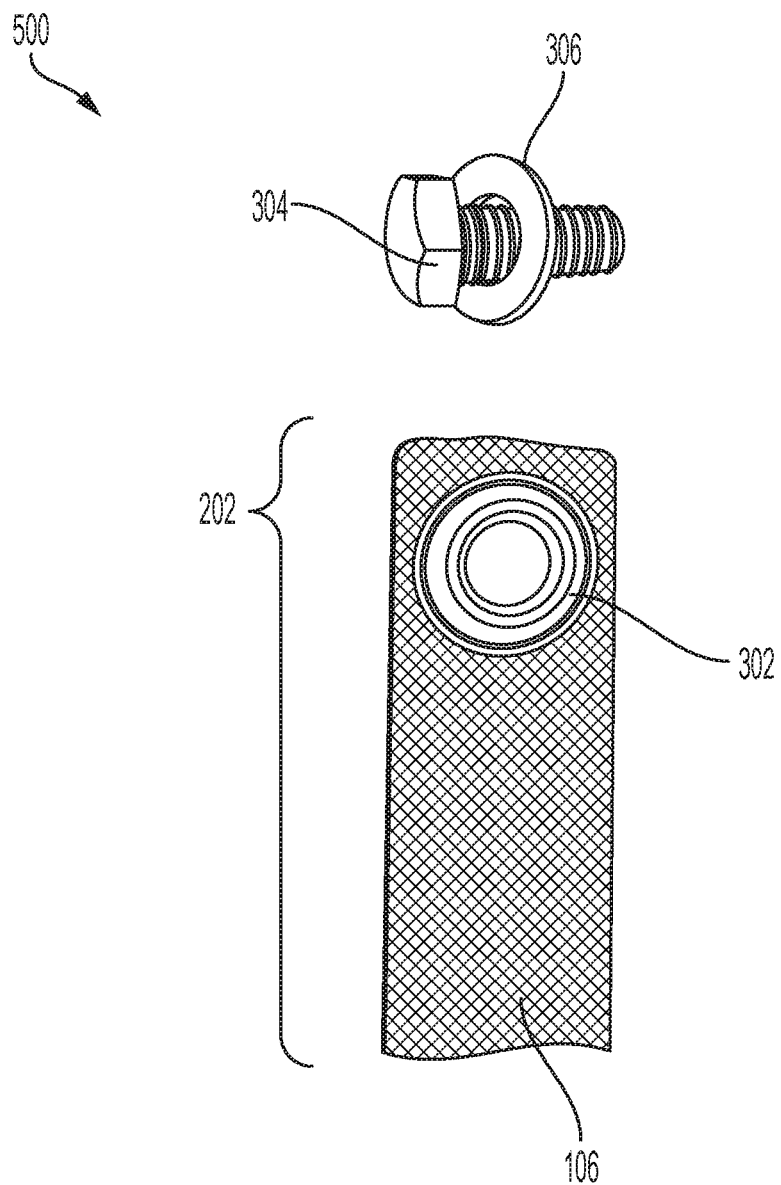
FIG. 5 depicts an illustration of a rope configured to be attached to a seismic data acquisition unit, in accordance with an implementation.

FIG. 5 depicts an illustration of a rope configured to be attached to a seismic data acquisition unit, in accordance with an implementation. The system 500 can include one or more system or component of systems 100, 200, 300 or 400 depicted in FIGS. 1-4. The system 500 illustrates the first end 202 of the rope 106. The first end 202 includes the opening 302, the bolt 304, and the disc 306. The bolt 304 can be inserted into opening 302. The disc 306 can be positioned between the bolt and the opening 302 such that the disc 306 does not go through the opening 302.

Figure 6:
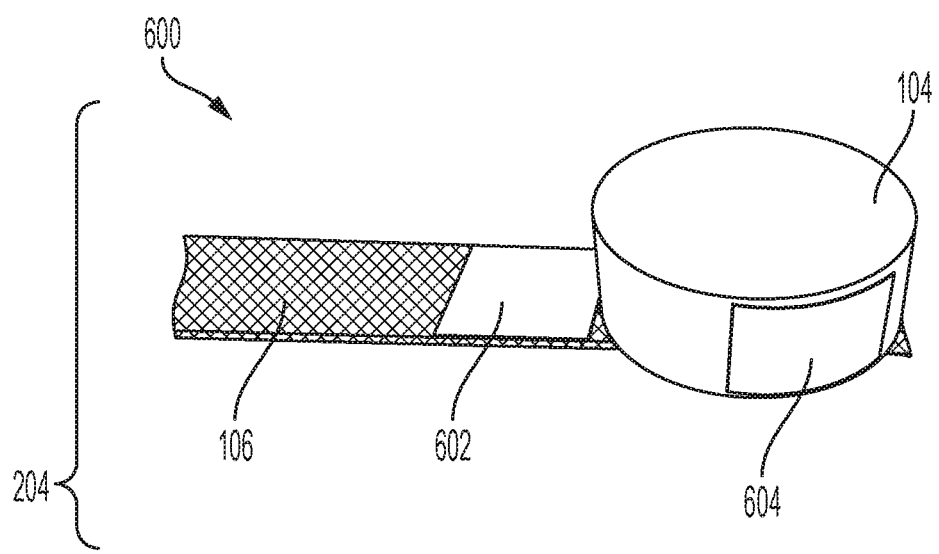
FIG. 6 depicts an illustration of a telltale attached to rope for a tail configuration, in accordance with an implementation.

FIG. 6 depicts an illustration of a telltale attached to rope for a tail configuration, in accordance with an implementation. The system 600 can include one or more system or component of systems 100, 200, 300, 400 or 500 depicted in FIGS. 1-5. System 600 illustrates the second end 204 of the rope 106. The second end 204 can include the reflective tape 602 on the rope 106. Reflective tape 604 can be placed on the telltale 104. Reflective tape 602 or 604 can facilitate identifying or locating the second end 204 or telltale 104. Reflective tape 602 or 604 can be made of flexible retroreflective material. The retroreflective material can include glass beads, micro-prisms or encapsulated lenses sealed onto a fabric or plastic substrate.

Figure 7:
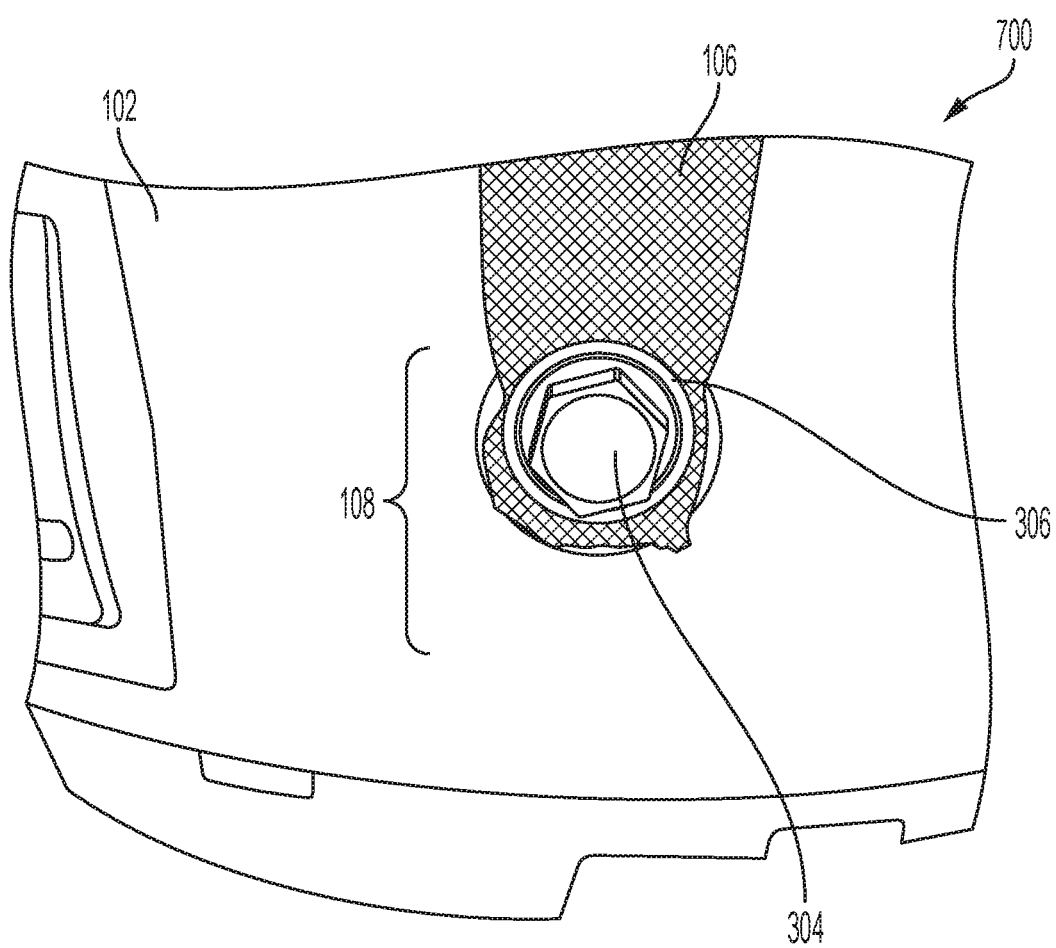
FIG. 7 depicts an illustration of a rope attached to a seismic data acquisition unit, in accordance with an implementation.

FIG. 7 depicts an illustration of a rope attached to a seismic data acquisition unit, in accordance with an implementation. The system 700 can include one or more system or component of systems 100, 200, 300, 400, 500 or 600 depicted in FIGS. 1-6. The system 700 includes the seismic data acquisition unit 102. The end 108 includes the bolt 304, disc 306, and rope 106 connected to the end 108 of the seismic data acquisition unit 102. As illustrated in FIG. 7, the bolt 304 secures the rope 106 to the seismic data acquisition unit 102 at the connection end 108.

Figure 8:
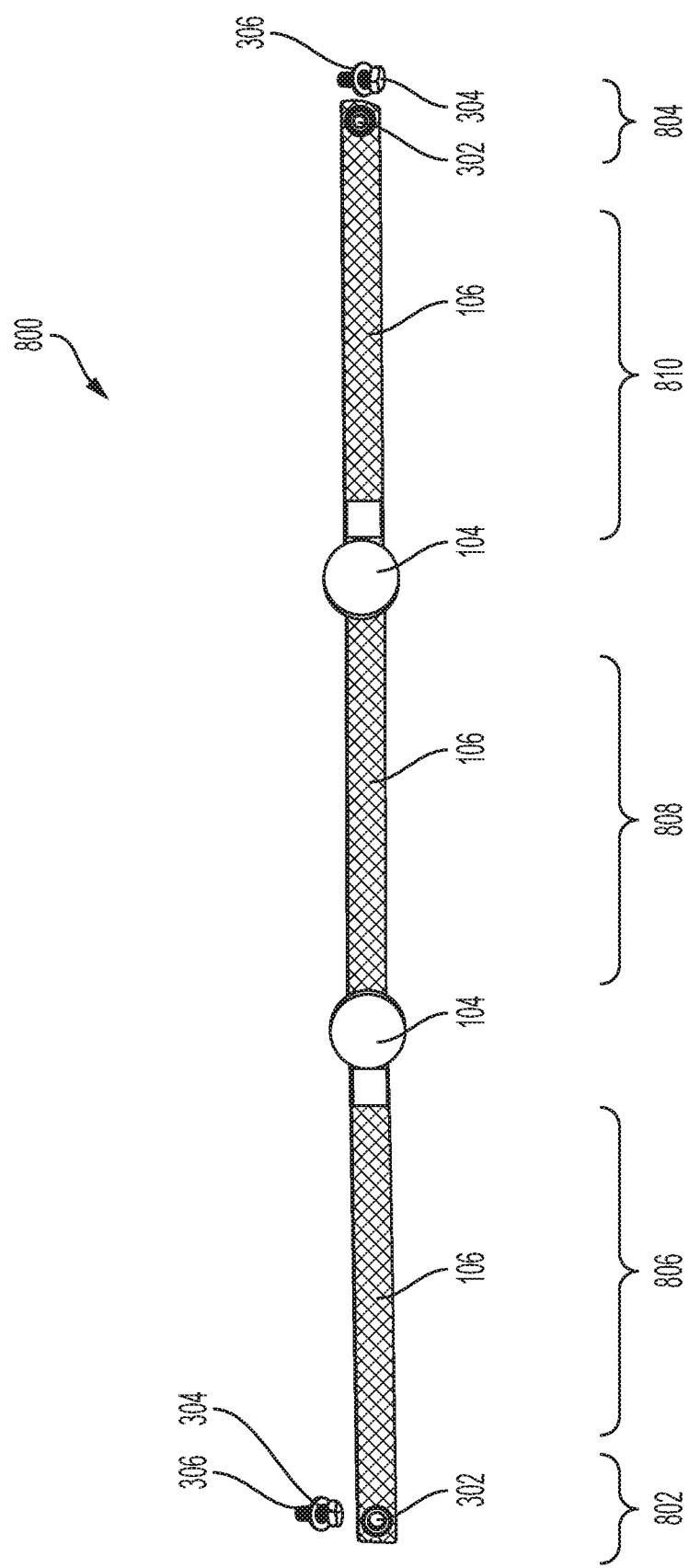
FIG. 8 depicts an illustration of a telltale attached to rope for a hoop configuration, in accordance with an implementation.

FIG. 8 depicts an illustration of a telltale attached to rope for a hoop configuration, in accordance with an implementation. The system 800 can include one or more system or component of systems 100, 200, 300, 400, 500, 600 or 700 depicted in FIGS. 1-7. The system 800 includes the rope 106 with multiple telltales 104 connected to the rope 106. The rope 106 can have a first end 802 and a second end 804. The first and second ends 804 can include the opening 302, which can be coupled to the seismic data acquisition unit 102 via bolt 304 and disc 306. The rope 106 can have multiple portions, such as a first portion 806 between the first end 802 and a first telltale 104, a middle portion 808 between the first telltale 104 and the second telltale 104, and a third portion 810 between the second telltale 104 and the second end 804.

Figure 9:
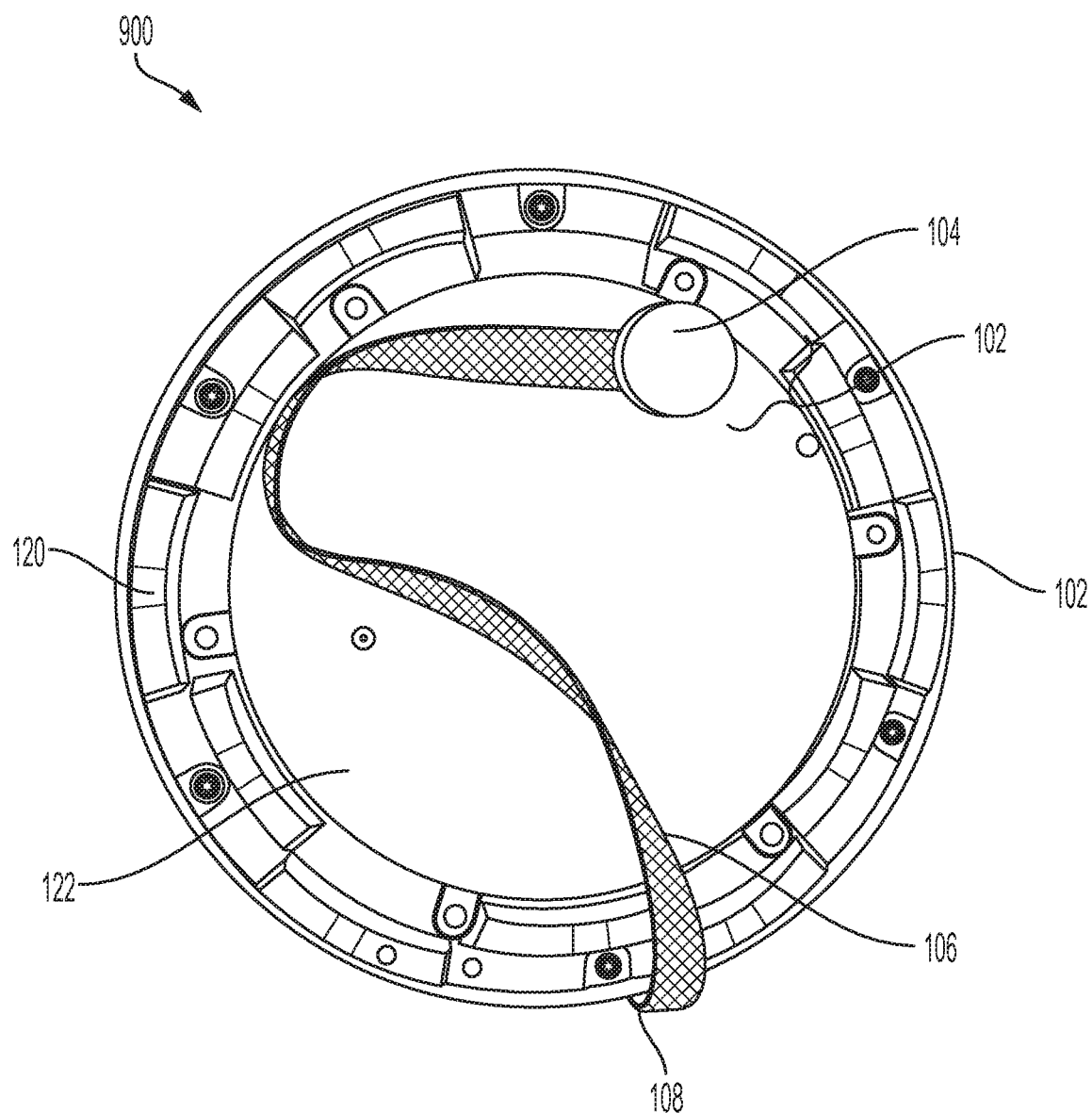
FIG. 9 depicts an illustration of a telltale attached to rope in a tail configuration and stored on a side of the seismic data acquisition unit, in accordance with an implementation.

FIG. 9 depicts an illustration of a telltale attached to rope in a tail configuration and stored on a side of the seismic data acquisition unit, in accordance with an implementation. The system 900 can include one or more system or component of systems 100, 200, 300, 400, 500, 600, 700, or 800 depicted in FIGS. 1-8. The system 900 includes the seismic data acquisition unit 102 with the rope 106 and telltale 104. The rope 106 and the telltale 104 can be stored in the cavity of the seismic data acquisition unit 102. The rope 106 and the telltale 104 can be placed on the top side 122 of the seismic data acquisition unit 102. The rope 106 and single telltale 104 can be configured in a tail configuration in which only one end of the rope 106 is coupled to the seismic data acquisition unit 102. The cleat ring 121 can form a cavity at the top side 122 in which the rope 106 and the telltale 104 can be placed such that a second seismic data acquisition unit 102 or other object can be placed or positioned on top of the top side 122 without damaging the telltale 104. The top side 122 can be referred to as a cavity. Stacking the units 102 can provide clearance of, for example, 0.75 inches, 1 inch, 1.5 inches, 2 inches, or more for the rope 106 and telltale 104 on the top side 122.

Figure 10:
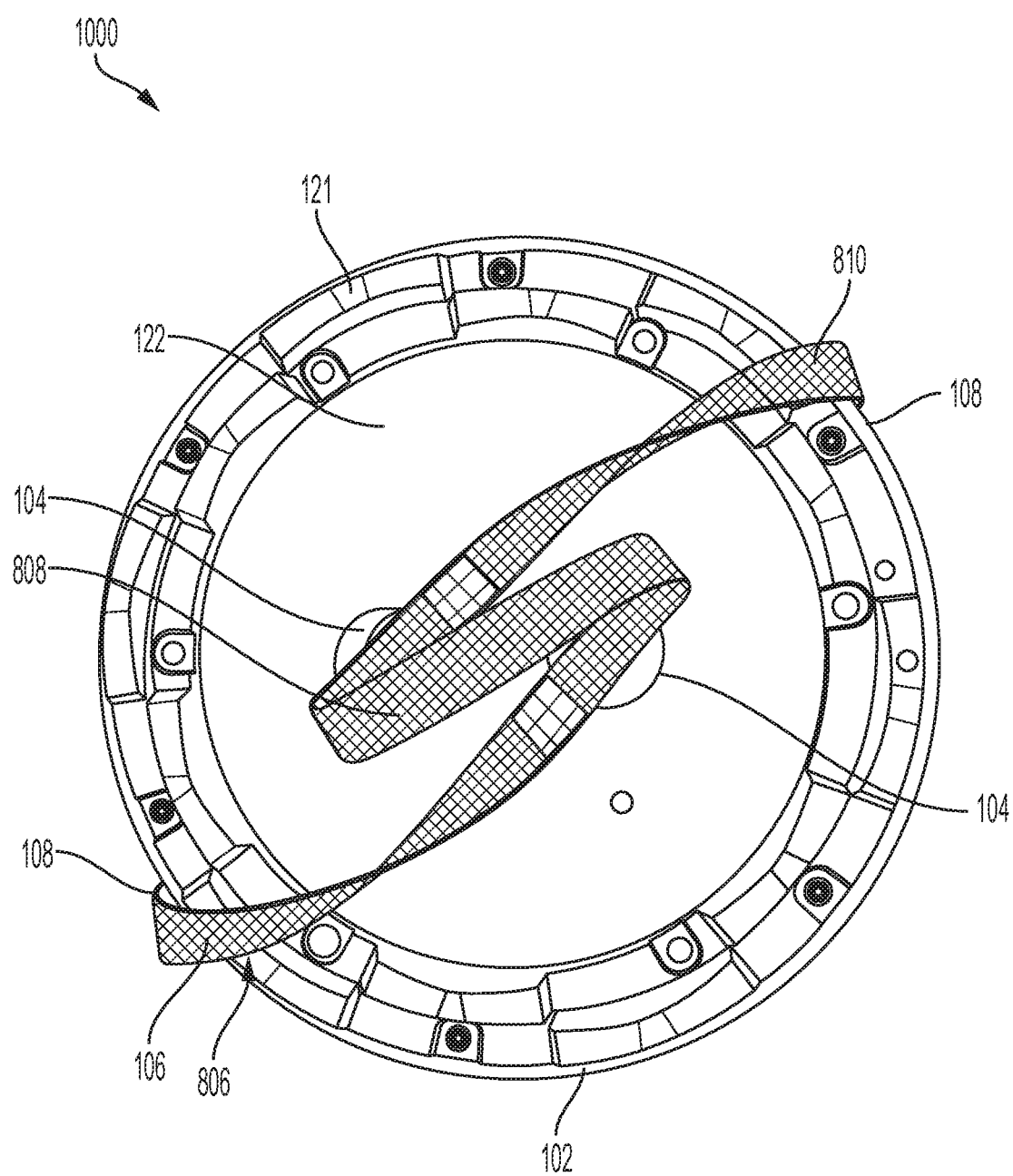
FIG. 10 depicts an illustration of a telltale attached to rope in a hoop configuration and stored on a side of the seismic data acquisition unit, in accordance with an implementation.

FIG. 10 depicts an illustration of a telltale attached to rope in a hoop configuration and stored on a side of the seismic data acquisition unit, in accordance with an implementation. The system 1000 can include one or more system or component of systems 100, 200, 300, 400, 500, 600, 700, 800 or 900 depicted in FIGS. 1-9. The system 1000 includes the seismic data acquisition unit 102 with the rope 106 and two telltales 104 attached to the seismic data acquisition unit 102 in a hoop configuration. The rope 106 and the two telltales 104 can be stored in the cavity of the seismic data acquisition unit 102. The rope 106 and the two telltales 104 can be placed in the cavity or top side 122 of the seismic data acquisition unit 102. The system 1000 illustrates the cleat rings 121 protruding or extending from a side of the top side 122 such that the rope 106 and telltales 104 can be placed on the top side 122 while a second seismic data acquisition unit 102 or object can be placed on top of the top side 122 without damaging the rope 106 or telltales 104. The rope 106 can include a first portion 804, middle portion 808 and third portion 810. The first portion 804, middle portion 808 and third portion 810 can have a length and flexibility in order to fold or curl such that the rope 106 and telltales 104 can be stored on the top side 104. The telltales 104 can be placed on the top side 122 such that they contact the top side 122. The rope 106 can be connected at both ends 108 to the seismic data acquisition unit 102 in a hoop configuration.

Figure 11:
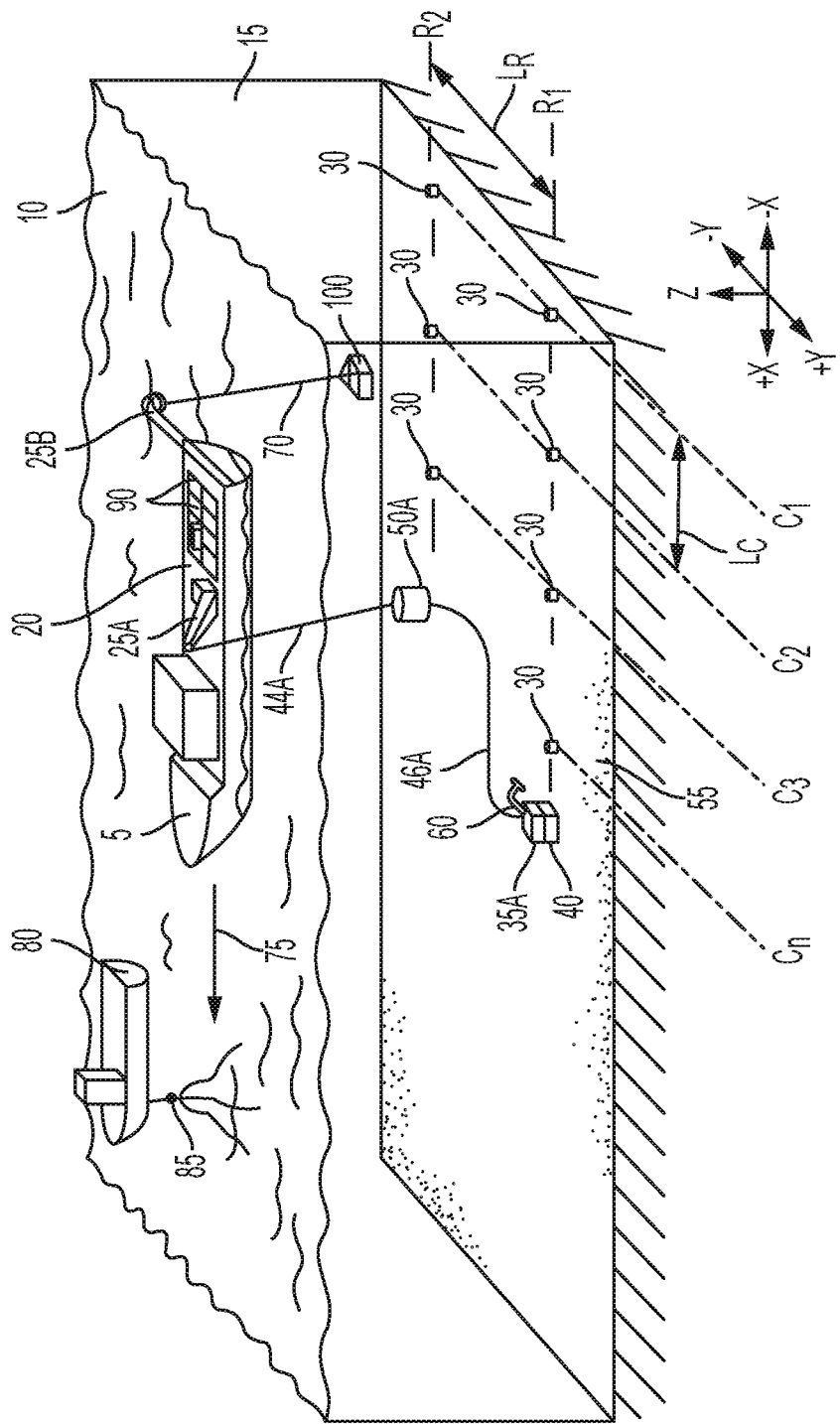
FIG. 11 depicts an isometric schematic view of an example of a seismic operation in deep water.

FIG. 11 is an isometric schematic view of an example of a seismic operation in deep water facilitated by a first marine vessel 5. FIG. 11 is a non-limiting illustrative example of a marine environment in which the systems and methods of the present disclosure can perform a seismic survey or calibrate a geophone and hydrophone pair.

By way of example, FIG. 11 illustrates a first vessel 5 positioned on a surface 10 of a water column 15 and includes a deck 20 which supports operational equipment. At least a portion of the deck 20 includes space for a plurality of sensor device racks 90 where seismic sensor devices (e.g., seismic data acquisition unit 102) are stored. The sensor device racks 90 may also include data retrieval devices or sensor recharging devices. The vessel 5 can include electronics, such as shipside electronics, that can retrieve seismic data from seismic data acquisition unit 102, perform quality assessment, status checks, or charge a batter of the seismic data acquisition unit 102.

The deck 20 also includes one or more cranes 25A, 25B attached thereto to facilitate transfer of at least a portion of the operational equipment, such as an ROV (e.g., second device 104) or seismic sensor devices (e.g., seismic data acquisition unit 102), from the deck 20 to the water column 15. For example, a crane 25A coupled to the deck 20 is configured to lower and raise an ROV 35A, which transfers and positions one or more sensor devices 30 (which can also be referred to as seismic data acquisition unit 102) on a seabed 55. The seabed 55 can include a lakebed 55, ocean floor 55, or earth 55. The ROV 35A is coupled to the first vessel 5 by a tether 46A and an umbilical cable 44A that provides power, communications, and control to the ROV 35A. A tether management system (TMS) 50A is also coupled between the umbilical cable 44A and the tether 46A. The TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon.

A crane 25B may be coupled (e.g., via a latch, anchor, nuts and bolts, screw, suction cup, magnet, or other fastener) to a stern of the first vessel 5, or other locations on the first vessel 5. Each of the cranes 25A, 25B may be any lifting device or launch and recovery system (LARS) adapted to operate in a marine environment. The crane 25B can be coupled to a seismic sensor transfer device 100 by a cable 70. The transfer device 100 may be a drone, a skid structure, a basket, or any device capable of housing one or more sensor devices 30 (or seismic data acquisition unit 102) therein. The transfer device 100 may be a structure configured as a magazine adapted to house and transport one or more sensor devices 30. The transfer device 100 may include an on-board power supply, a motor or gearbox, or a propulsion system. The transfer device 100 can be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. Alternatively, the transfer device 100 may not include any integral power devices or not require any external or internal power source. The cable 70 can provide power or control to the transfer device 100. Alternatively, the cable 70 may be an umbilical, a tether, a cord, a wire, a rope, and the like, that is configured solely for support of the transfer device 100.

The ROV 35A can include a seismic sensor device storage compartment 40 that is configured to store one or more seismic sensor devices 30 (e.g., first devices 102) therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. The seismic sensor devices 30 can be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. The seismic sensor devices 30 can be deployed and retrieved from the storage compartment 40 by a robotic device 60, such as a robotic arm, an end effector or a manipulator, disposed on the ROV 35A.

The seismic sensor device 30 (or seismic data acquisition unit 102; or seismic data acquisition unit 102 can include seismic sensor device 30) may be referred to as seismic data acquisition unit 30 or 100 or node 30 or first device 102. The seismic data acquisition unit 30 can record seismic data. The seismic data acquisition unit 30 may include one or more of at least one geophone, at least one hydrophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit, or one or more components can be external to the seismic sensor device 30. During recording, the seismic sensor device 30 may operate in a self-contained manner such that the node does not require external communication or control. The seismic sensor device 30 may include several geophones and hydrophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55. Once the storage compartment 40 is depleted of the first plurality of seismic sensor devices 30, the transfer device 100 is used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. Reloading of the storage compartment 40 can be provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 is reloaded. This process may repeat as until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. The ROV 35A can synchronize a clock of the node 30 at the time of planting. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55, or collect data from the seismic sensor device 30 without retrieving the device 30. The ROV 35A can adjust the clock of the device 30 while collecting the seismic data. The retrieved seismic sensor devices 30 are placed into the storage compartment 40 of the ROV 35A. In some implementations, the ROV 35A may be sequentially positioned adjacent each seismic sensor device 30 on the seabed 55 and the seismic sensor devices 30 are rolled, conveyed, or otherwise moved from the seabed 55 to the storage compartment 40. The seismic sensor devices 30 can be retrieved from the seabed 55 by a robotic device 60 disposed on the ROV 35A.

Once the storage compartment 40 is full or contains a pre-determined number of seismic sensor devices 30, the transfer device 100 is lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 is used to ferry the retrieved sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, safety issues and mechanical stresses placed on equipment related to the ROV 35A are minimized as the ROV 35A may be subsurface for longer periods.

For example, the first vessel 5 can travel in a first direction 75, such as in the +X direction, which may be a compass heading or other linear or predetermined direction. The first direction 75 may also account for or include drift caused by wave action, current(s) or wind speed and direction. The plurality of seismic sensor devices 30 can be placed on the seabed 55 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent sensor devices 30 in the rows is shown as distance LR and the distance between adjacent sensor devices 30 in the columns is shown as distance LC. While a substantially square pattern is shown, other patterns may be formed on the seabed 55. Other patterns include non-linear receiver lines or non-square patterns. The pattern(s) may be pre-determined or result from other factors, such as topography of the seabed 55. The distances LR and LC can be substantially equal and may include dimensions between about 60 meters to about 400 meters, or greater. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed can be limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. In examples where two receiver lines (rows R1 and R2) are being laid, the first vessel includes a first speed of between about 0.2 knots and about 0.6 knots. In some implementations, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row R1 may be deployed. When the single receiver line is completed a second vessel 80 can be used to provide a source signal. In some cases, the first vessel or other device can provide the source signal. The second vessel 80 is provided with a source device or acoustic source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row R1 in this example). During the time the second vessel 80 is making the passes, the first vessel 5 continues deployment of a second receiver line. However, the time involved in making the passes by the second vessel 80 is much shorter than the deployment time of the second receiver line. This causes a lag time in the seismic survey as the second vessel 80 sits idle while the first vessel 5 is completing the second receiver line.

The first vessel 5 can use one ROV 35A to lay sensor devices to form a first set of two receiver lines (rows R1 and R2) in any number of columns, which may produce a length of each receiver line of up to and including several miles. The two receiver lines (rows R1 and R2) can be substantially (e.g., within +/−10 degrees) parallel. When a single directional pass of the first vessel 5 is completed and the first set (rows R1, R2) of seismic sensor devices 30 are laid to a predetermined length, the second vessel 80, provided with the source device 85, is utilized to provide the source signal. The second vessel 80 can make eight or more passes along the two receiver lines to complete the seismic survey of the two rows R1 and R2.

While the second vessel 80 is shooting along the two rows R1 and R2, the first vessel 5 may turn 180 degrees and travel in the X direction in order to lay seismic sensor devices 30 in another two rows adjacent the rows R1 and R2, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows R1 and R2 are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array can be limited by the length of the tether 46A or the spacing (distance LR) between sensor devices 30.

Figure 12:
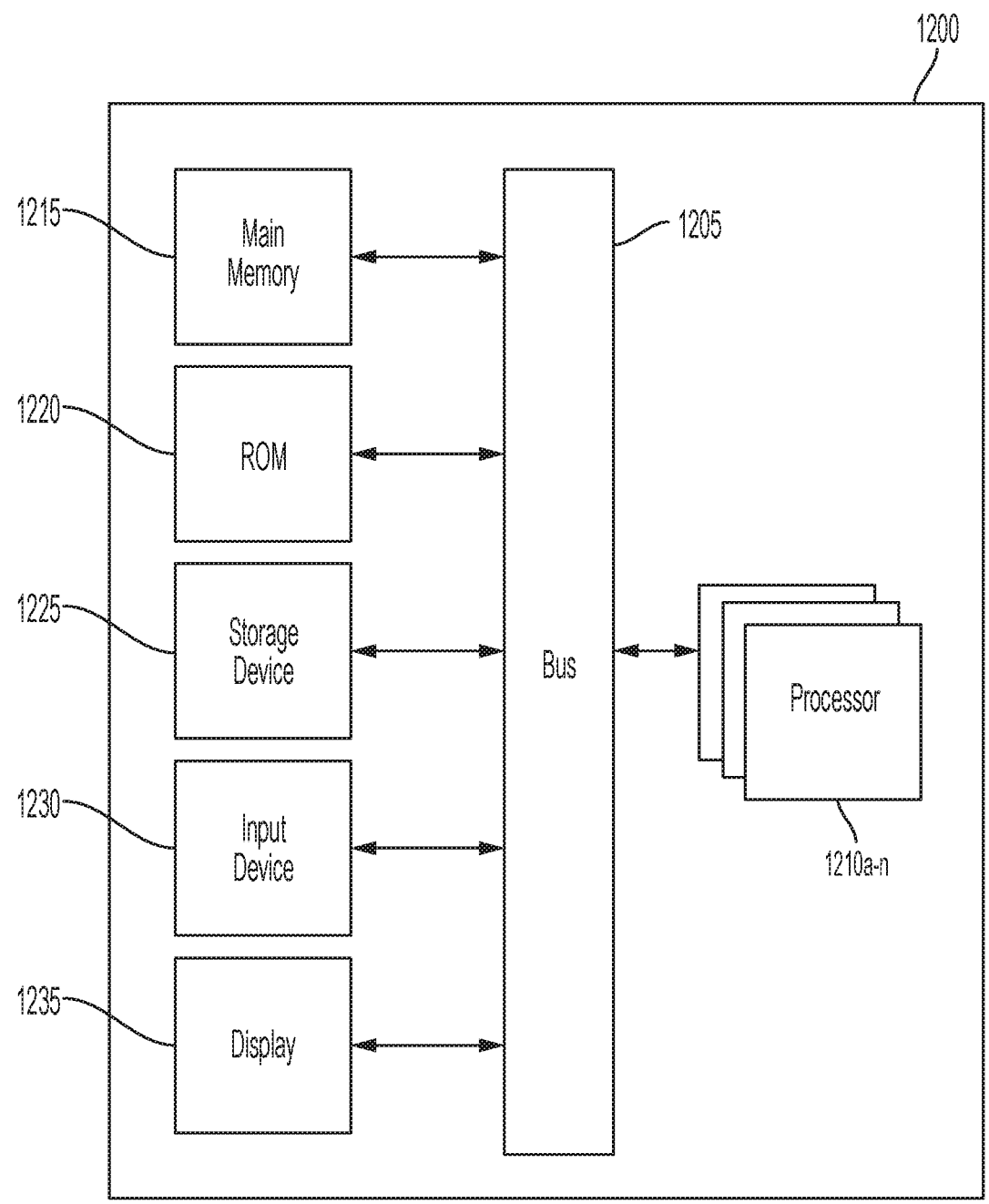
FIG. 12 depicts a block diagram of an architecture for a computing system employed to implement various elements of the systems or components depicted in FIGS. 1-9 and 9.

FIG. 12 depicts a block diagram of an architecture for a computing system employed to implement various elements of the data processing system to perform the functions depicted in FIGS. 1-11. FIG. 12 is a block diagram of a data processing system including a computer system 1200 in accordance with an embodiment. The computer system can include or execute a coherency filter component. The computing system 1200 includes a bus 1205 or other communication component for communicating information and a processor 1210a-n or processing circuit coupled to the bus 1205 for processing information. The computing system 1000 can also include one or more processors 1210 or processing circuits coupled to the bus for processing information. The computing system 1200 also includes main memory 1215, such as a random access memory (RAM) or other dynamic storage device, coupled to the bus 1205 for storing information, and instructions to be executed by the processor 1010. Main memory 1215 can also be used for storing seismic data, binning function data, images, reports, tuning parameters, executable code, temporary variables, or other intermediate information during execution of instructions by the processor 1210. The computing system 1200 may further include a read only memory (ROM) 1220 or other static storage device coupled to the bus 1205 for storing static information and instructions for the processor 1210. A storage device 1225, such as a solid state device, magnetic disk or optical disk, is coupled to the bus 1205 for persistently storing information and instructions.

The computing system 1200 may be coupled via the bus 1205 to a display 1235 or display device, such as a liquid crystal display, or active matrix display, for displaying information to a user. An input device 1230, such as a keyboard including alphanumeric and other keys, may be coupled to the bus 1205 for communicating information and command selections to the processor 1210. The input device 1230 can include a touch screen display 1235. The input device 1230 can also include a cursor control, such as a mouse, a trackball, or cursor direction keys, for communicating direction information and command selections to the processor 1210 and for controlling cursor movement on the display 1235.

The processes, systems and methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes described herein. One or more processors in a multi-processing arrangement may also be employed to execute the instructions contained in main memory 1215. In some embodiments, hard-wired circuitry may be used in place of or in combination with software instructions to effect illustrative implementations. Thus, embodiments are not limited to any specific combination of hardware circuitry and software.

Although an example computing system has been described in FIG. 12, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

What is claimed is:

1. A system to locate seismic data acquisition units in a marine environment, comprising:
   a first seismic data acquisition unit comprising:
      a case having a wall defining an internal compartment;
      a power source, a clock, a seismic data recorder, and at least one geophone disposed within the case;
      a cleat ring comprising a ring of cleats and positioned on a perimeter of a first side of the first seismic data acquisition unit to couple, in a stack, the first seismic data acquisition unit with a second seismic data acquisition unit;
   a rope having a first end coupled to a first portion of the first seismic data acquisition unit and a second end coupled to a second portion of the first seismic data acquisition unit;
   a cavity formed by the cleat ring on the first side of the first seismic data acquisition unit;
   a telltale component to indicate a position of the seismic data acquisition units and coupled to a portion of the rope, the telltale component including at least one of a transmitter, beacon, radio frequency identifier, near field communications, and light; and
   the rope and the telltale component stored in the cavity of the first seismic data acquisition unit, wherein the second seismic data acquisition unit is coupled with the first seismic data acquisition unit via the cleat ring on the perimeter of the first side to form the stack.

2. The system of claim 1, wherein the first end is coupled to the wall of the first seismic data acquisition unit outside the perimeter formed by the cleat ring, and the second end is coupled to the wall of the first seismic data acquisition unit outside the perimeter formed by the cleat ring.

3. The system of claim 1, wherein the first end coupled to the first portion of the first seismic data acquisition unit within the perimeter formed by the cleat ring, and the second end coupled to the second portion of the first seismic data acquisition unit within the perimeter formed by the cleat ring forms a hoop.

4. The system of claim 1, comprising:
   the telltale component comprising an acoustic beacon;
   the acoustic beacon configured to disable acoustic transmission when the telltale component is stored in the cavity formed by the cleat ring on the first side.

5. The system of claim 1, comprising;
the telltale component comprising an optical beacon;
the optical beacon configured to initiate optical transmission responsive to the telltale component being removed from the cavity formed by the cleat ring on the first side or responsive to removal of the second seismic data acquisition unit from the stack.

6. The system of claim 1, comprising:
a wireless module that transmits status information for the first seismic data acquisition unit.

7. The system of claim 1, comprising:
the rope comprising a flat rope.

8. The system of claim 1, comprising:
a second telltale component coupled to the rope.

9. A method to locate seismic data acquisition units in a marine environment, comprising:
providing a first seismic data acquisition unit comprising:
a case having a wall defining an internal compartment;
a power source, a clock, a seismic data recorder, and at least one geophone disposed within the case;
a cleat ring comprising a ring of cleats and positioned on a perimeter of a first side of the first seismic data acquisition unit to couple, in a stack, the first seismic data acquisition unit with a second seismic data acquisition unit;
a cavity formed by the cleat ring on the first side of the first seismic data acquisition unit;
providing a rope having a first end coupled to a first portion to the first seismic data acquisition unit and a second end coupled to a second portion of the first seismic data acquisition unit;
providing a telltale component configured to indicate a position of the seismic data acquisition units and coupled to a portion of the rope, the telltale component including at least one of a transmitter, beacon, radio frequency identifier, near field communications, and light, wherein the rope and the telltale component are stored in the cavity of the first seismic data acquisition unit, wherein the second seismic data acquisition unit is coupled with the first seismic data acquisition unit via the cleat ring on the perimeter of the first side to form the stack.

10. The method of claim 9, comprising:
coupling the first end to the first portion of the first seismic data acquisition unit within the perimeter formed by the cleat ring; and
coupling the second end to the second portion of the first seismic data acquisition unit within the perimeter formed by the cleat ring to form a hoop.

11. The method of claim 10, comprising:
moving an underwater vehicle comprising an arm towards the hoop;
moving the arm within a perimeter of the hoop;
moving, by the underwater vehicle, the first seismic data acquisition unit via the hoop.

12. The method of claim 9, comprising:
detecting, by an underwater vehicle, the first seismic data acquisition unit via an acoustic beacon from the telltale component.

13. The method of claim 9, comprising:
detecting, by an underwater vehicle, the first seismic data acquisition unit via an optical beacon from the telltale component.

14. The method of claim 9, comprising:
transmitting, by a wireless module, status information for the first seismic data acquisition unit.

15. The method of claim 9, comprising:
coupling a second telltale component to the rope.

16. A system to locate seismic data acquisition units in a marine environment, comprising:
a first seismic data acquisition unit comprising:
a case having a wall defining an internal compartment;
a power source, a clock, a seismic data recorder, and at least one geophone disposed within the case;
a cleat ring comprising a ring of cleats and positioned on a perimeter of a first side of the first seismic data acquisition unit to couple, in a stack, the first seismic data acquisition unit with a second seismic data acquisition unit;
a rope having a first end coupled to a first portion of the first seismic data acquisition unit;
a cavity formed by the cleat ring on the first side of the first seismic data acquisition unit;
a telltale component to indicate a position of the seismic data acquisition units and coupled to a portion of the rope, the telltale component including at least one of a transmitter, beacon, radio frequency identifier, near field communications, and light; and
the rope and the telltale component stored in the cavity of the first seismic data acquisition unit, wherein the second seismic data acquisition unit is coupled with the first seismic data acquisition unit via the cleat ring on the perimeter of the first side to form the stack.

17. The system of claim 16, wherein the first end is coupled to the wall of the first seismic data acquisition unit outside the perimeter formed by the cleat ring.

18. The system of claim 16, comprising:
the telltale component comprising an acoustic beacon;
the acoustic beacon configured to disable acoustic transmission when the telltale component is stored in the cavity formed by the cleat ring on the first side.

19. The system of claim 16, comprising;
the telltale component comprising an optical beacon;
the optical beacon configured to initiate optical transmission responsive to the telltale component being removed from the cavity formed by the cleat ring on the first side or responsive to removal of the second seismic data acquisition unit from the stack.

20. The system of claim 16, comprising:
a wireless module that transmits status information for the first seismic data acquisition unit.

* * * * *